(12) United States Patent
Akkaya et al.

(10) Patent No.: US 10,872,430 B2
(45) Date of Patent: Dec. 22, 2020

(54) ACTIVE ILLUMINATION 3D ZONAL IMAGING SYSTEM

(71) Applicant: Microsoft Technology Licensing, LLC, Redmond, WA (US)

(72) Inventors: Onur Can Akkaya, Palo Alto, CA (US); Cyrus Soli Bamji, Freemont, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/558,027

(22) Filed: Aug. 30, 2019

(65) Prior Publication Data

US 2019/0385321 A1 Dec. 19, 2019

Related U.S. Application Data

(63) Continuation of application No. 15/646,124, filed on Jul. 11, 2017, now Pat. No. 10,430,958.

(51) Int. Cl.

| | |
|---|---|
| G06T 7/521 | (2017.01) |
| G01S 7/481 | (2006.01) |
| G01S 7/4863 | (2020.01) |
| G01S 17/10 | (2020.01) |
| G01S 17/42 | (2006.01) |
| G01S 17/18 | (2020.01) |
| G01S 17/32 | (2020.01) |
| G01S 17/89 | (2020.01) |
| H04N 5/225 | (2006.01) |
| H04N 5/235 | (2006.01) |
| H04N 5/445 | (2011.01) |

(52) U.S. Cl.
CPC ............ *G06T 7/521* (2017.01); *G01S 7/4817* (2013.01); *G01S 7/4863* (2013.01); *G01S 17/10* (2013.01); *G01S 17/18* (2020.01); *G01S 17/32* (2013.01); *G01S 17/42* (2013.01); *G01S 17/89* (2013.01); *H04N 5/2256* (2013.01); *H04N 5/2354* (2013.01); *H04N 5/44504* (2013.01); *G06T 2207/10028* (2013.01)

(58) Field of Classification Search
CPC ........ G06T 7/521; G01S 17/32; G01S 17/107
USPC ...................................................... 348/135
See application file for complete search history.

(56) References Cited

U.S. PATENT DOCUMENTS

| | | |
|---|---|---|
| 6,166,384 A | 12/2000 | Dentinger et al. |
| 2011/0013172 A1 | 1/2011 | Takahashi |
| 2015/0195490 A1 | 7/2015 | Oyman |
| 2016/0080673 A1 | 3/2016 | Zhang |
| 2016/0182891 A1* | 6/2016 | Ko ...................... H04N 13/296 348/47 |

(Continued)

OTHER PUBLICATIONS

"Non Final Office Action Issued in U.S. Appl. No. 15/359,643", dated Nov. 15, 2019, 30 Pages.

(Continued)

*Primary Examiner* — Nam D Pham

(57) ABSTRACT

An active illumination range camera comprising illumination and imaging systems that is operable to provide a range image of a scene in the imaging system's field of view (FOV) by partitioning the range camera FOV into sub-FOVs, and controlling the illumination and imaging systems to sequentially illuminate and image portions of the scene located in the respective sub-FOVs.

20 Claims, 7 Drawing Sheets

(56) References Cited

U.S. PATENT DOCUMENTS

2017/0089829 A1    3/2017    Bartholomew
2019/0154809 A1    5/2019    Akkaya et al.

OTHER PUBLICATIONS

Chen, et al., "Beam Steering for Virtual/Augmented Reality Displays with a Cycloidal Diffractive Waveplate", In the Journal of Optics Express, vol. 24, Issue No. 7, Mar. 28, 2016, 12 Pages.
Kim, et al., "Wide-angle, Nonmechanical Beam Steering with High Throughput utilizing Polarization Gratings", In the Journal of Applied Optics, vol. 50, Issue No. 17, Jun. 6, 2011, 4 Pages.
Ren, et al., "Liquid-Crystal Microlens Arrays Using Patterned Polymer Networks", In the Journal of Optics Letter, vol. 29, Issue No. 14 Jul. 15, 2004, pp. 1608-1610.
"Final Office Action Issued in U.S. Appl. No. 15/359,643", dated Jun. 26, 2020, 28 Pages.
"International Search Report and Written Opinion Issued in PCT Application No. PCT/US19/068922", dated Apr. 6, 2020, 12 Pages.

* cited by examiner

US 10,872,430 B2

ACTIVE ILLUMINATION 3D ZONAL IMAGING SYSTEM

CROSS-REFERENCE TO RELATED APPLICATION

This application is a continuation application of and claims priority to U.S. patent application Ser. No. 15/646,124, entitled "ACTIVE ILLUMINATION 3D ZONAL IMAGING SYSTEM," filed on Jul. 11, 2017, the disclosure of which is incorporated herein by reference in its entirety.

BACKGROUND

An active illumination range camera comprises an illumination system that it controls to transmit light to illuminate features in a scene that the camera images, and a photosensor having pixels on which the camera registers light that the features reflect from the transmitted light back to the camera. The range camera processes reflected light from the features that pixels in the photosensor register to provide measures of distances to the features in the scene. In a time of flight (TOF) range camera the camera processes the registered reflected light from a feature to determine a round trip flight time of light from the camera to the feature and back to the camera. The TOF range camera determines a measure of a distance of the feature from the camera based on the round-trip flight time and the speed of light. A TOF range camera may be a gated TOF (GT-TOF) range camera or a "continuous wave" TOF (CW-TOF) range camera. In an active illumination stereo range camera, the camera provides measures of distances to features in the scene by determining binocular disparity for the features responsive to reflected light from the features that the camera registers. The camera triangulates the features based on their respective disparities to determine measures of distances to the features. A range camera may provide measures of distances to features in a scene that the camera images in an image of the scene referred to as range image.

SUMMARY

An aspect of an embodiment of the disclosure relates to providing an active illumination range camera comprising illumination and imaging systems that is operable to provide a range image of a scene in the imaging system's field of view (FOV) by partitioning the range camera FOV into sub-FOVs, and controlling the illumination and imaging systems in synchronization to sequentially illuminate and image portions of the scene located in the respective sub-FOVs. Hereinafter, a sub-FOV may be referred to as a zone, and illuminating a portion of a scene located in a given zone with light from the illumination system may be referred to as illuminating the given zone. Imaging a portion of a scene located in the given zone may be referred to as imaging the given zone. In an embodiment, illuminating a given zone may comprise controlling the illumination system so that light in a field of illumination (FOI) of the illumination system illuminates substantially only that portion of the scene located in the given zone. Imaging a given zone may comprise operating a photosensor of the camera so that substantially only pixels on which features in the given zone are imaged register light to acquire data for providing a range image of the scene.

By sequentially illuminating and imaging zones to provide a range image of the scene, the range camera may operate to acquire the range image at intensities of illumination greater than intensities practically available when operating to simultaneously illuminate and image the entirety of the FOV. Furthermore, since a zone is a portion of and therefor narrower than, the full FOV of the camera, acquiring the range image by imaging zones operates to mitigate deleterious effects of multipath light.

In an embodiment the active illumination range camera, hereinafter also referred to as a zonal range camera, may comprise any one or any combination of more than one of a continuous wave CW-TOF zonal range camera, a gated TOF zonal range camera, and/or a stereo zonal range camera.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Figure 1A:
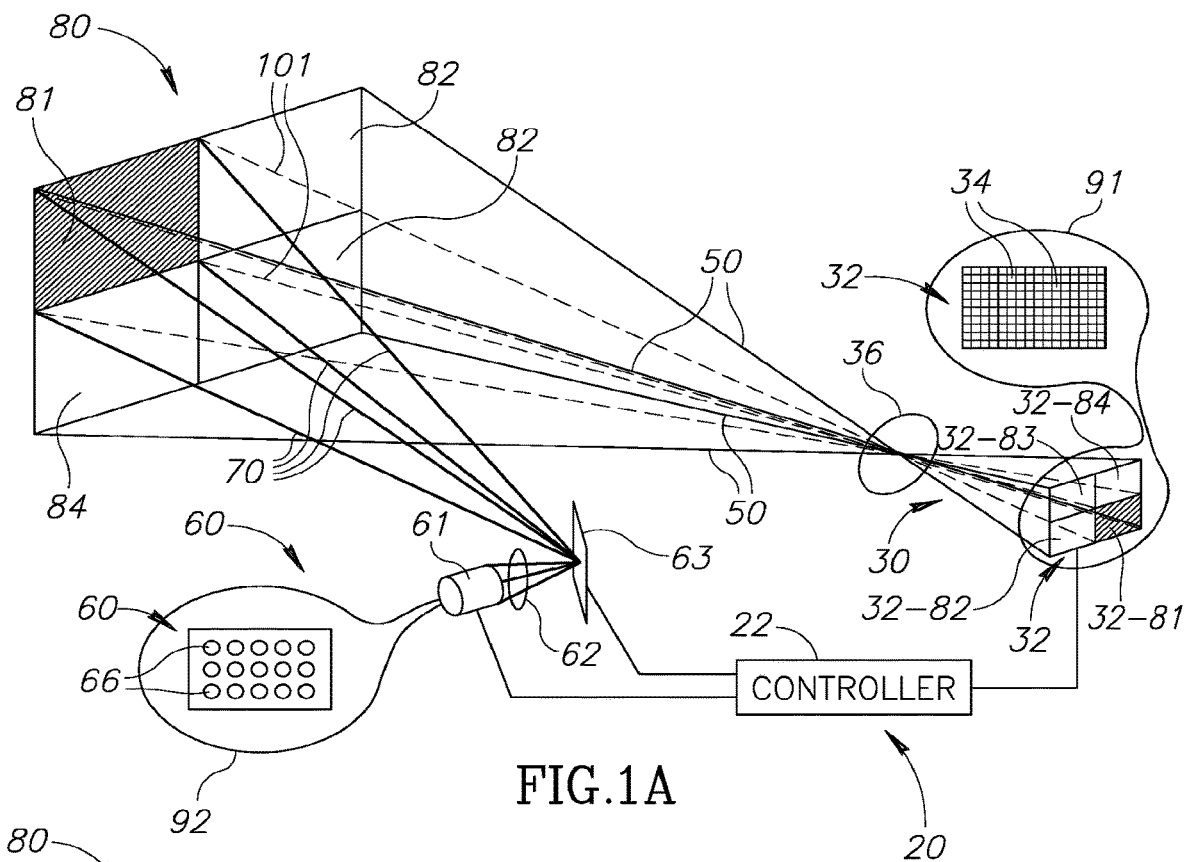
FIGS. 1A-1D schematically illustrate an active illumination zonal range camera imaging a scene by sequentially illuminating and imaging different zones of the scene, in accordance with an embodiment of the disclosure.

In the detailed discussion below features of a zonal range camera, operating to acquire a range image of a scene in accordance with an embodiment of the disclosure are discussed with reference to FIGS. 1A-1D. Three different procedures by which a CW-TOF zonal range camera may operate in accordance with an embodiment of the disclosure to acquire a range image of a scene are discussed with respect to flow diagrams given in FIGS. 2A-2C. Operation of a photosensor and pixels in a CW-TOF zonal range camera are schematically illustrated and discussed with reference to FIG. 3.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

FIGS. 1A-1D schematically show an active illumination, zonal range camera 20 imaging a scene 80 in accordance with an embodiment of the disclosure. Zonal range camera 20 comprises an imaging system 30, an illumination system 60, and a controller 22 configured to control the illuminating and imaging systems.

Controller 22 may comprise any electronic and/or optical processing and/or control circuitry, to provide and enable functionalities that the controller may require to support its operations in controlling the illuminating and imaging systems. By way of example, controller 22 may comprise any one, or any combination of more than one of, a microprocessor, an application specific circuit (ASIC), field programmable array (FPGA) and/or system on a chip (SOC). Controller 22 may control and/or have access to a memory (not shown) which may comprise any electronic and/or optical circuitry suitable for storing data and/or computer executable instructions and may, by way of example, comprise any one or any combination of more than one of a flash memory, random access memory (RAM), read only memory (ROM), and/or erasable programmable read-only memory (EPROM).

Imaging system 30 optionally comprises a photosensor 32 having light sensitive pixels 34 shown in an enlarged image of the photosensor in an inset 91, and an optical system schematically represented by a lens 36. Scene 80 is located in a FOV 50 of range camera 20 shown in FIG. 1A. The FOV is determined by imaging system 30 and outlined by bounding lines labeled with the reference label, 50, of the FOV. Optical system 36 operates to receive light reflected by features (features not shown) in scene 80 from light transmitted by illumination system 60 and image the received light on photosensor 32 to acquire data for a range image of the scene. In an embodiment, each pixel 34 may selectively be controlled independently of other pixels 34 to be turned ON or OFF for an exposure period to register light incident on the pixel when ON and provide a measurement of the registered light.

A pixel in a camera photosensor registers incident light from a feature in a scene that optics in the camera focuses on the pixel by accumulating, also referred to as integrating, negative or positive electric charge provided respectively by electrons or holes from electron-hole pairs that the incident light generates in the pixel during an exposure period of the pixel. The charge provided by electrons or holes from electron-hole pairs may be referred to generically as "photocharge". Camera photosensors are typically configured so that their pixels accumulate electrons, conventionally also referred to as "photoelectrons", and thereby negative photocharge originating from electron-hole pairs, rather than holes and thereby positive photocharge to register incident light.

Converting an amount of photocharge that a pixel in the photosensor accumulates, or integrates, responsive to incident light from the scene to a voltage, hereinafter also referred to as a readout voltage, provides a measurement of an amount of the incident light that the pixel registers. Providing the readout voltage may involve temporarily storing the accumulated photocharge in a storage capacitor of the pixel and transferring the photocharge to a readout capacitor for conversion of the stored photocharge to a readout voltage. Determining a value for a readout voltage of a pixel may be referred to as reading the pixel. Reading the pixels in the photosensor or a portion of the photosensor may be referred to as reading the photosensor or portion of the photosensor. A collection of values of substantially all the readout voltages, or function of the readout voltages, comprised in the photosensor or portion of the photosensor is referred to as a frame of the photosensor or portion thereof and may be used to provide an image of the scene or portion thereof.

Illumination system 60 may comprise a light source 61, an optical system represented by a lens 62, and a beam steerer 63 that controller 22 may control to produce and configure a desired field of illumination (FOI) of light and direct the FOI in a desired direction to illuminate different portions of scene 80 within FOV 50 of range camera 20. In FIGS. 1A-1D controller 22 is shown by way of example, controlling illumination system 60 to generate and direct a FOI 70 schematically shown as frustum shaped and outlined by bounding lines labeled with the reference label 70 of the FOI.

Light source 61 optionally comprises at least one light producing element such as a laser or light emitting diode (LED). Optionally, light source 61 comprises an array 65 of light producing elements 66, such as VCSELs (vertical cavity surface emitting lasers) schematically shown in an inset 92 that are individually controllable to shape a beam of light, and thereby FOI 70, from the light source. In an embodiment, light producing elements 66 may be turned ON and OFF independently of each other to change a shape and/or direction of FOI 70 provided by illumination system 60. Light source 61 is configured for generating, optionally IR (infrared) light, suitable for use with a type of range camera to which zonal range camera 20 may belong. For example, if range camera 20 operates as a stereo range camera, light source 61 may be configured to illuminate a scene imaged by the camera with structured light, such as, optionally, a textured light pattern. If range camera 20 operates as a TOF range camera, light source 61 may be controllable to generate temporally modulated light for illuminating a scene that is imaged by the camera. If operating as a gated, GT-TOF, range camera, light source 61 of range camera 20 may be configured to generate a train of discrete, short light pulses for illuminating a scene. The GT-TOF range camera determines distances to features in a scene that the camera images based on round trip flight times of the discrete light pulses from the camera to the features and back to the camera. If range camera 20 operates as a continuous wave, CW-TOF, range camera, light source 61 may be configured to generate a continuous wave of time modulated light for illuminating a scene. The CW-TOF camera determines distances to features in the scene based on phase shifts of light that the features reflect from the transmitted light relative to the modulation of the transmitted light.

Optical system 62 of illumination system 60 may comprise a collimating lens and diffuser (not shown) that receives and shapes light from light source 61 to provide a desired FOI, such as FOI 70, and transmits the light to FOI steerer 63. FOI beam steerer 63 is controllable to selectively steer the light that it receives so that it illuminates a desired region of a scene imaged by zonal range camera 20. FOI beam steerer 63 may comprise any one or any combination of more than one, of various light steering elements such as, liquid crystal gratings, electrowetting prisms, conventional micro-sized mirrors, and/or micromirror arrays. By way of example, FOI beam steerer 63 is schematically shown as a mirror in FIG. 1A.

In an embodiment of the disclosure to image a scene, such as scene 80, controller 22 partitions FOV 50 into a plurality of zones and controls illumination system 60 to configure and direct the illumination system's FOI 70 to sequentially illuminate the zones, one zone of the plurality of zones at a time. While a given zone is illuminated by light transmitted by illumination system 60 in FOI 70, controller 22 turns ON pixels 34 in photosensor 32 to register light reflected from the transmitted light by features of scene 80 located in the given zone for use in determining distances to the features and providing a range image of scene 80. Pixels 34 that image features of scene 80 which are located outside of the given zone may be turned OFF so that they do not register light for use in determining distances to features in scene 80.

A region of photosensor 32 comprising pixels 34 that are turned ON for an exposure period to register light from features in a given zone illuminated by FOI 70 may be referred to as an active or an activated region of the photosensor and turning ON pixels 34 in a region of photosensor 32 may be referred to as activating the region. A region of photosensor 32 comprising pixels 34 that are turned OFF may be referred to as an inactive or an inactivated region of the photosensor and turning OFF pixels in a region of photosensor 32 may be referred to as inactivating the region. It is noted that referring to a pixel as turned ON refers to the pixel being operated to accumulate photocharge for use in providing a range image of a scene responsive to light transmitted by illumination system 60 in FOI 70 during an exposure period of the pixel. Referring to a pixel as being turned OFF and inactive refers to the pixel being operated so that it does not accumulate photocharge responsive to light transmitted by illumination system 60 for use in providing a range image. While OFF, however, a pixel may not be totally inactive and may for example be operated to transfer photocharge accumulated during an exposure period to a storage capacitor, maintain storage of transferred photocharge in a storage capacitor, or transfer photocharge to a readout capacitor.

By way of example, FIG. 1A schematically shows FOV 50 of zonal range camera 20 partitioned by controller 22 into a plurality of optionally four zones. Each zone intersects scene 80 in a different respective region, 81, 82, 83, or 84 of scene 22 and may be identified by, and be referred to by the numeral labeling its intersection region. Light from features of scene 80 located in zones 81, 82, 83, or 84 are imaged by imaging system 30 on pixels 34 in regions 32-81, 32-82, 32-83, and 32-84 respectively of photosensor 30.

In FIG. 1A controller 22 is shown controlling illumination system 60 to configure and direct FOI 70 to illuminate zone 81 and imaging system 30 to turn ON pixels 34 in corresponding region 32-81 of photosensor 30 to activate the region for an exposure period. Visualization aid lines 101 in the figure schematically indicate light from region 81 collected by imaging system 30 and imaged on corresponding region 32-81 of photosensor 32. During the exposure period region 32-81 registers light reflected by features of scene 80 in zone 81 from light transmitted in FOI 70 to acquire data for determining distances to the features. While activating photosensor region 32-81, controller 22 optionally turns OFF pixels 32 in photosensor regions 32-82, 32-83, 32-84 to inactivate the regions. Active region 32-81 is shown shaded to differentiate the active region from inactive regions 32-82, 32-83, 32-84 of photosensor 32 which are shown unshaded.

Figure 1B:
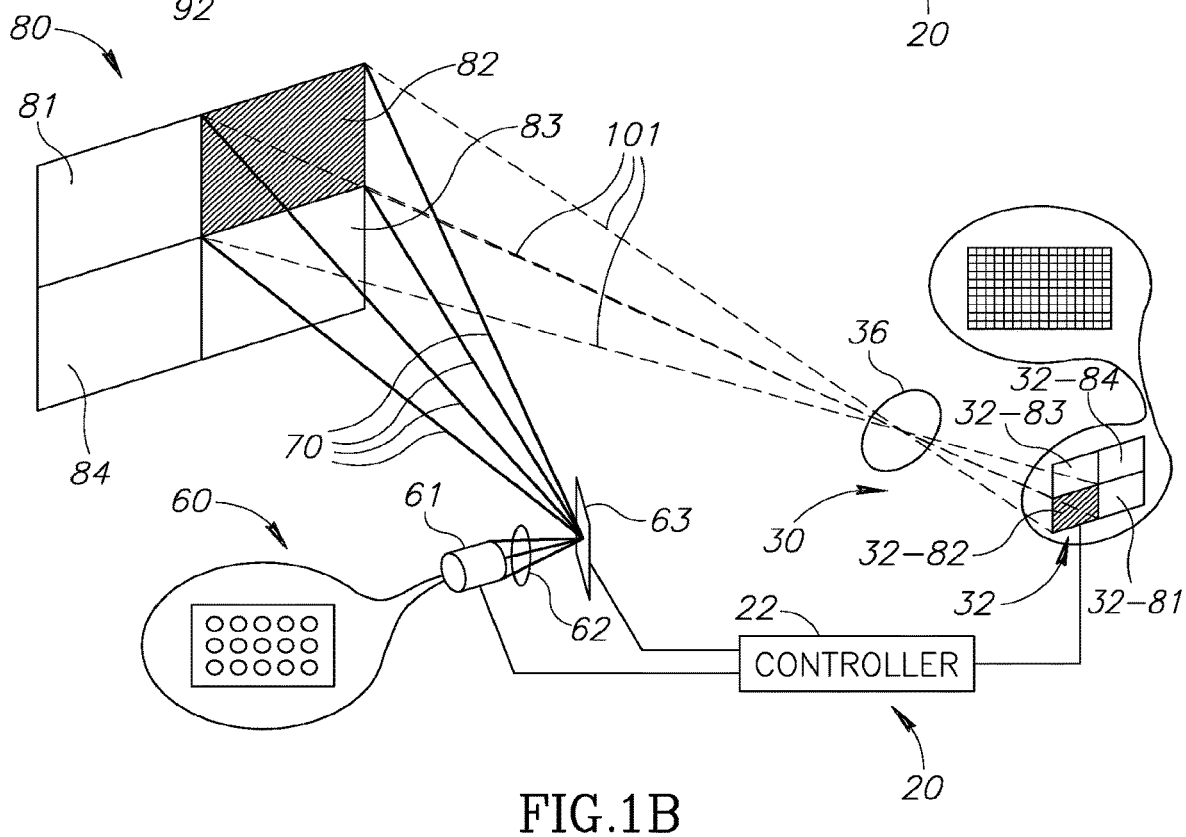
Figure 1C:
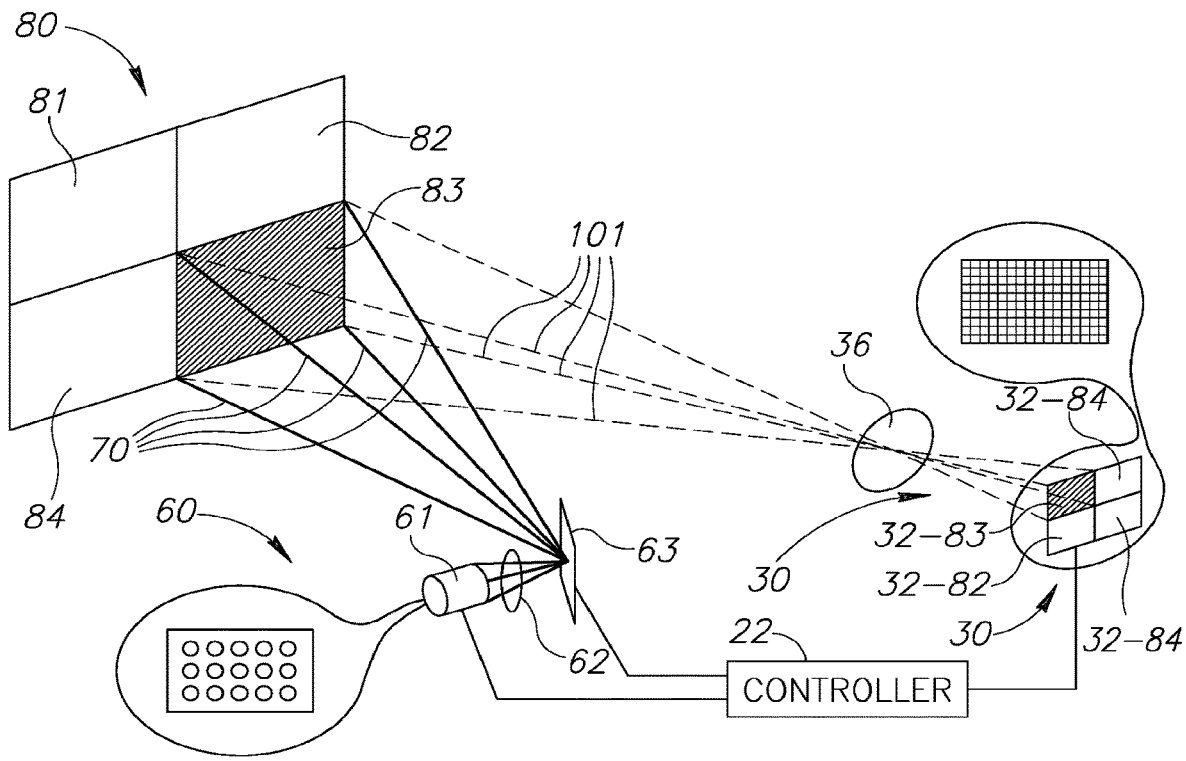
Figure 1D:
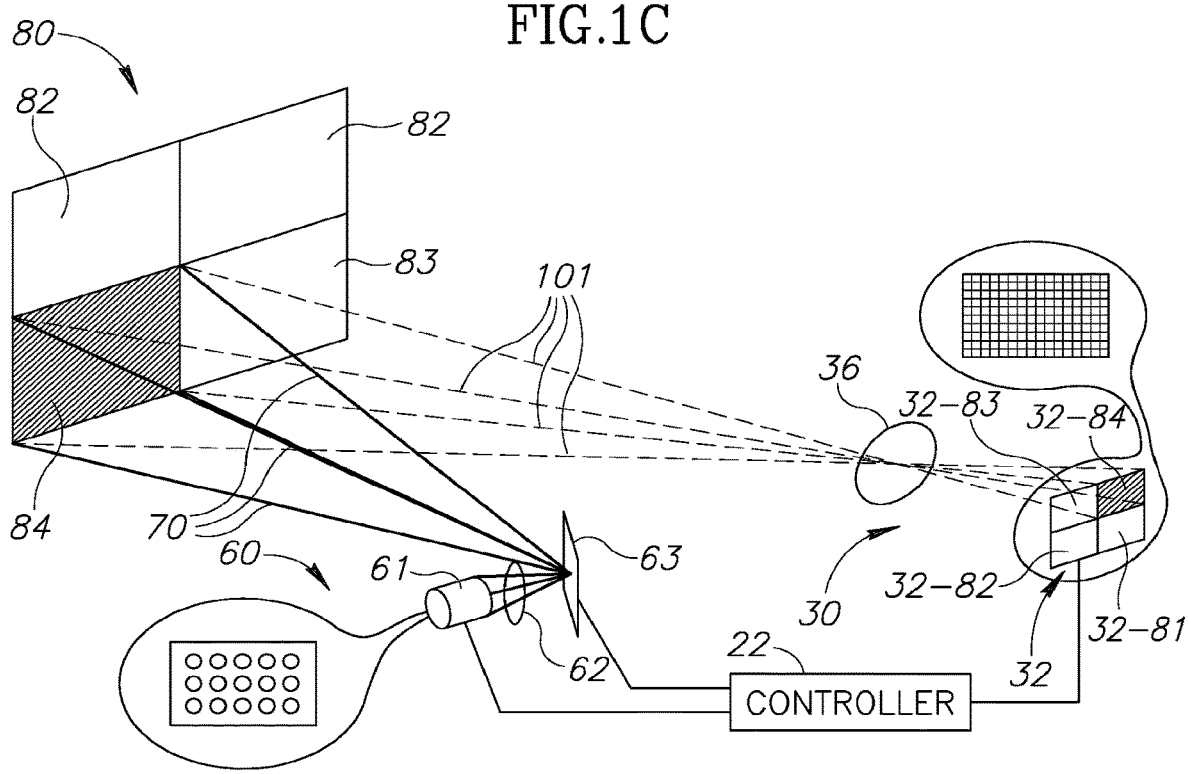

Following illuminating and registering reflected light from zone 81, controller 22 may control zonal range camera 20 to sequentially illuminate and register reflected light from features of scene 80 located in zones 82, 83, and 84 as schematically shown in FIGS. 1B, 1C and 1D respectively. In an embodiment controller 22 may repeat sequentially illuminating and registering light from zones 81-84 until sufficient data is acquired for features in FOV 50 to provide a range image of scene 80 in accordance with an embodiment. Different procedures that zonal range camera 20 operating as a CW-TOF zonal range camera may perform to acquire a range image of scene 80 are discussed below.

It is noted that whereas in FIGS. 1A-1D FOV 50 is shown, and discussed in the above discussion as partitioned, into four zones, practice of embodiments of the disclosure are not limited to partitioning an FOV of a zonal range camera, such as zonal range camera 20, into four zones. Controller 22 may partition a FOV into a number of zones that is more or less than four. It is also noted that whereas in FIG. 1A zones 81-84 are schematically indicated as characterized by rectangular cross sections that subtend equal solid angles at illumination system 60, practice of an embodiment of the disclosure is not limited to zones having rectangular cross sections or equal solid angles. Different zones may subtend different solid angles at illumination system 60 and a zone may have a cross section that is not rectangular. A zone may, for example have a circular, hexagonal, or an irregular cross section.

In an embodiment controller 22 may be configured to determine a number of zones into which to partition FOV 50 based on reflectance of features in scene 80 for light transmitted by illumination system 60 and intensity of illumination available from illumination system 60. For example, a scene with low reflectance features may require illumination by light having relatively high intensity to provide a satisfactory range image of the scene. For such a situation controller 22 may partition scene 80 into a relatively large number of relatively small zones so that illumination system 60 may be controlled to illuminate each zone with light characterized by relatively high intensity. In an embodiment controller 22 may control illumination system 60 to illuminate different zones with different intensity light. For example, controller 22 may control illumination system 60 to illuminate highly reflective zones with lesser intensity light than poorly reflective zones and poorly reflective zones with higher intensity light. Additionally or alternatively, controller 22 may differentially modulate sensitivity of pixels in photosensor 32 to light so that pixels on which optical system 36 images features from different zones of a scene register light during exposure periods having different durations. For example, pixels on which features from highly reflective zones are imaged may be controlled to register light during exposure periods that are shorter than the exposure periods of pixels on which features from poorly reflective zones are imaged.

Figure 2A:
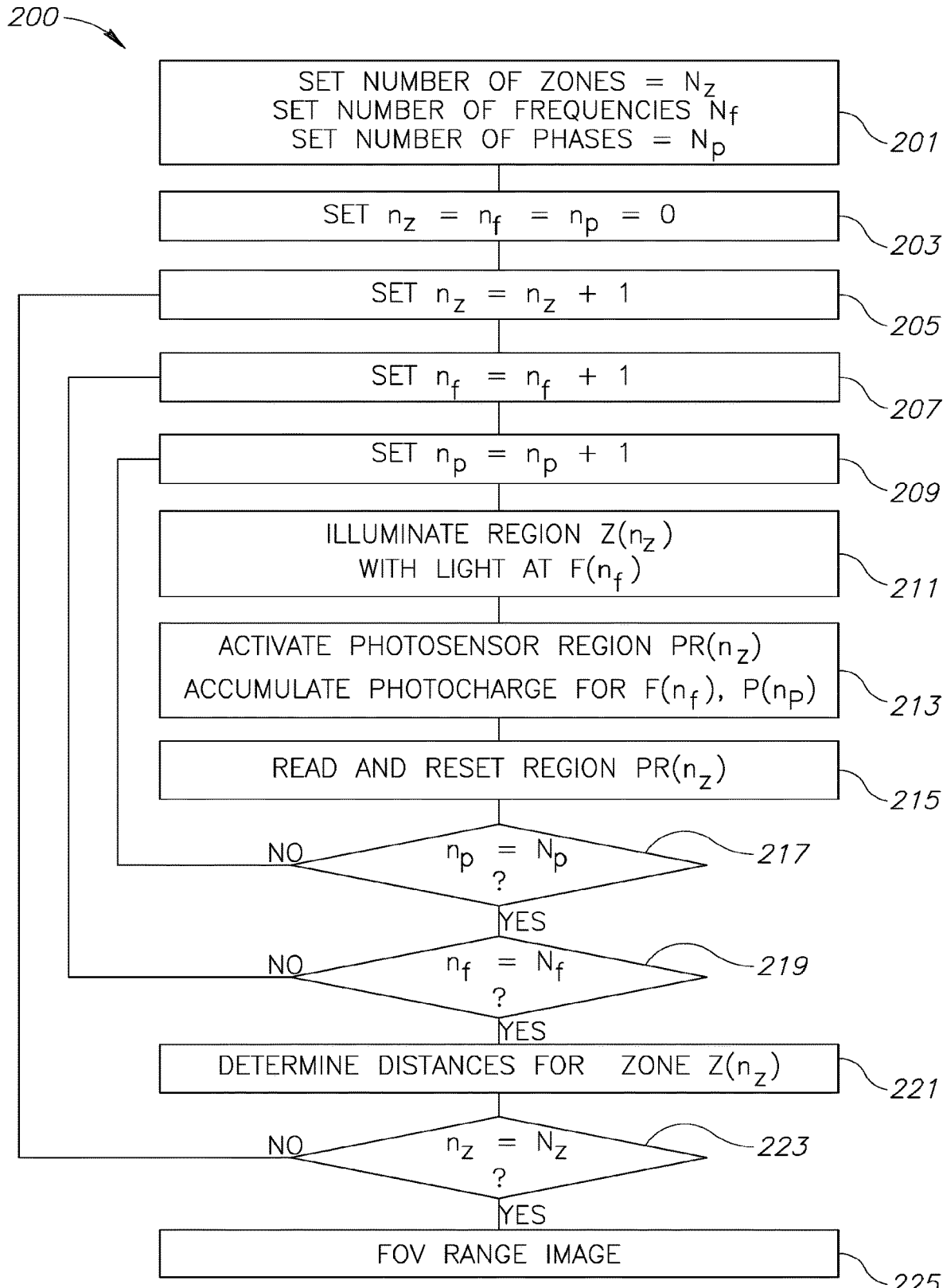
FIGS. 2A-2C show flow diagrams of different zonal imaging procedures in accordance with which a continuous wave time of flight, a CW-TOF, zonal range camera may execute to acquire a range image of a scene, in accordance with an embodiment of the disclosure.

FIG. 2A shows a flow diagram 200 of a procedure by which CW-TOF zonal range camera 20 operating as a CW-TOF zonal range camera may determine distances to features in a scene, such as by way of example scene 80, and provide a range image of the scene In a block 201 controller 22 optionally determines a number $N_z$ of zones, $Z(n_z)$, $1 \le n_z \le N_z$, into which to partition FOV 50, a number $N_f$ of frequencies, $F(n_f)$, $1 \le n_f \le N_f$ of light at which to illuminate scene 80, and for each frequency a number $N_p$ of sampling offset phases $P(n_p)$, $1 \le n_p \le N_f$ at which to acquire data for providing a range image of the scene. Optionally in a block 203 the controller zeros counting variables $n_z$, $n_f$, $n_p$ that correspond respectively to $N_z$, $N_f$, and $N_p$. In blocks 205, 207, and 209 respectively, the controller increases counting variables $n_z$, $n_f$, $n_p$ by 1, and sets $n_z=(n_z+1)$, $n_f=(n_f+1)$, and $n_p=(n_p+1)$.

Optionally, in a block 211, controller 22 controls illumination system 60 to illuminate zone $Z(n_z)$ with light at a frequency $F(n_f)$. And, optionally, in a block 213 the controller turns ON pixels 34 in a region $PR(n_z)$ of photosensor 32 on which imaging system 30 images light from features in zone $Z(n_z)$ to operate at an offset phase $P(n_p)$ and activate the region for an exposure period. During the exposure period pixels 34 in activated region $PR(n_z)$ accumulate for frequency $F(n_f)$ and offset phase $P(n_p)$ photocharge generated by light that the features in zone $Z(n_z)$ reflect back to CW-TOF zonal camera 22 from light transmitted by illumination system 60 to illuminate zone $Z(n_z)$. In a block 215 controller 22 reads pixels 34 in photosensor 32 to acquire data at frequency $F(n_f)$ and offset phase $P(n_p)$ for determining a range image for scene 80.

In a decision block 217 controller 22 determines if counting variable $n_p$ is equal to the maximum $N_p$, and if $n_p$ is not equal to $N_p$, returns to block 209 to increase $n_p$ by 1 and again proceeds through actions in block 211 to 217. If on the other hand in block 217 controller 22 determines that $n_p=N_p$ the controller proceeds to a decision block 219.

In decision block 219, controller 22 determines if counting variable $n_f$ is equal to its maximum $N_f$, and if $n_f$ is not equal to $N_f$, returns to block 207 to increase $n_f$ by 1 and again proceed through actions in block 207 to 219. If on the other hand in block 217 controller 22 determines that $n_f=N_f$ CW-TOF zonal camera 20 has acquired data advantageous for determining distances to features of scene 80 in zone $Z(n_z)$ and the controller proceeds optionally to a block 221. In block 221 the controller uses the acquired data to determine distances to features in zone $Z(n_z)$ and may proceed to a decision block 223.

In decision block 223, controller 22 determines if counting variable $n_z$ is equal to its maximum $N_z$, and if $n_z$ is not equal to $N_z$, returns to block 205 to increase $n_z$ by 1 and again proceed through actions in block 207 to 223. If on the other hand in block 223 controller 22 determines that $n_z=N_z$, the CW-TOF camera 20 has acquired data for each of frequencies $F(n_f)$, $1 \leq n_f \leq N_f$, and offset phases $P(n_p)$ $1 \leq n_p \leq N_p$, for all $N_z$ zones into which FOV 50 is partitioned, and determined distances to features of scene 80 in the $N_z$ zones. The controller may proceed to a block 225 and combine distances determined for features in all of the zones to provide a range image for features in FOV 50 and thereby a range image for scene 80.

Figure 2B:
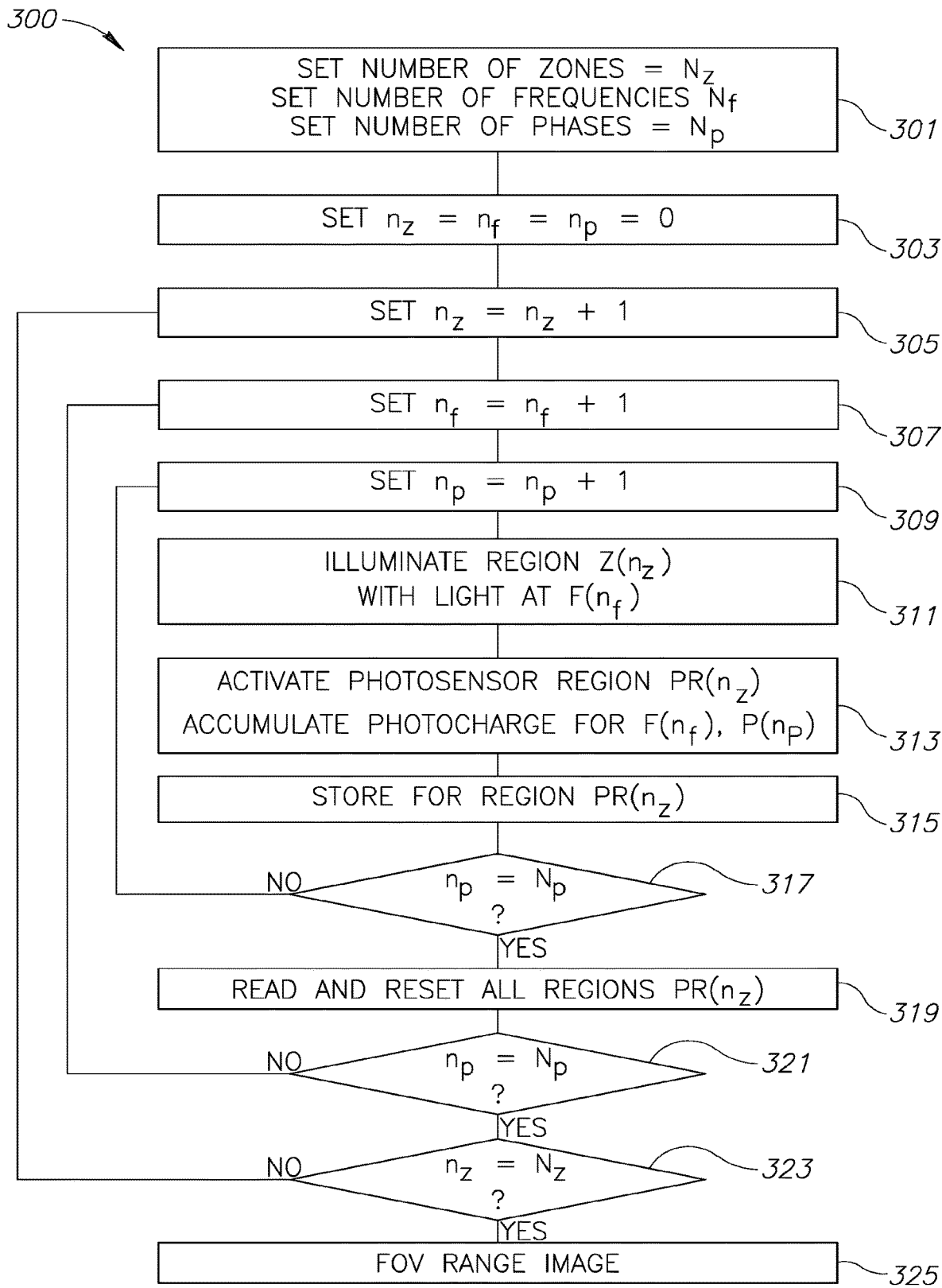

FIG. 2B shows a flow diagram 200 for another procedure by which CW-TOF zonal range camera 20 operating as a CW-TOF zonal range camera may provide a range image of scene 80.

Blocks 301 and 302 of procedure 300 are identical to blocks 201 and 202 of procedure 200, and in blocks 305, 307, and 309 controller 22 sets $n_f=(n_f+1)$, $n_p=(n_p+1)$, and $n_z=(n_z+1)$. Optionally, in a block 311, controller 22 controls illumination system 60 to illuminate zone $Z(n_z)$ with light at a frequency $F(n_f)$. And in a block 313, for frequency $F(n_f)$ and offset phase $P(n_p)$, the controller activates photosensor region $PR(n_z)$ to accumulate photocharge generated by light reflected back to CW-TOF zonal camera 22 from light transmitted by illumination system 60 to illuminate zone $Z(n_z)$ by features in the zone. In a block 315 controller 22 controls pixels 34 in $PR(n_z)$ to store photocharge that the pixels respectively accumulated in storage capacitors of the pixels.

In a decision block 317 controller 22 determines if counting variable $n_z$ is equal to the maximum $N_z$. If $n_z$ is not equal to $N_z$, controller 22 returns to block 319 to read and reset all photosensor regions $PR(n_z)$ and proceed to a decision block 321 to determine if $n_p$ is equal to the maximum $N_p$. If $n_p$ is not equal to $N_p$ the controller returns to block 307 to increase $n_p$ by 1 and again proceed to execute actions in blocks 309 to 321, otherwise controller 22 may proceed to a decision block 323 to determine if $n_f$ is equal to $N_f$. If $n_f$ is not equal to $N_f$ controller 22 returns to block 305 to increase $n_f$ by 1 and again proceed to execute actions in blocks 307 to 323. If on the other hand $n_f$ is equal to $N_f$ CW-TOF camera 20 has acquired sufficient data to provide a range image for FOV 50 and scene 80, and in a block 325 processes the data to provide the range image.

Figure 2C:
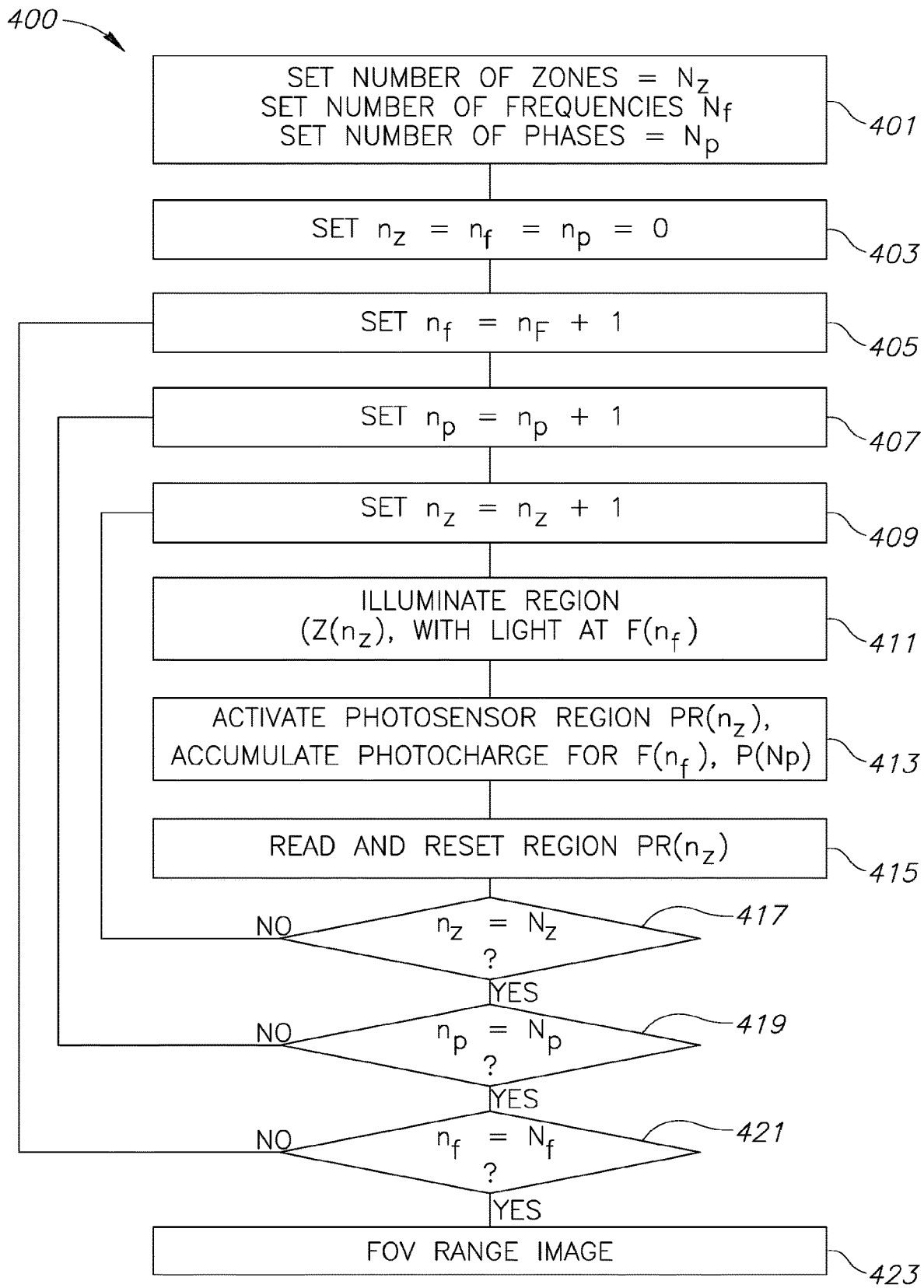

FIG. 2C shows a flow diagram 400 for yet another procedure by which zonal range camera 20 operating as a CW-TOF zonal range camera may operate to provide a range image of scene 80.

Blocks 401 and 402 of procedure 400 are identical to blocks 201 and 202 of procedure 200 and in blocks 405, 407, and 409 controller 22 sets $n_f=(n_f+1)$, $n_p=(n_p+1)$, and $n_z=(n_z+1)$. Optionally, in a block 411, controller 22 controls illumination system 60 to illuminate zone $Z(n_z)$ with light at a frequency $F(n_f)$. And in a block 413, for frequency $F(n_f)$ and offset phase $P(n_p)$, the controller activates photosensor region $PR(n_z)$ to accumulate photocharge generated by light reflected by features in zone $Z(n_z)$ back to CW-TOF zonal camera 22 from light transmitted by illumination system 60 to illuminate zone $Z(n_z)$. In a block 415 controller 22 reads and resets pixels 34 in $PR(n_z)$.

In a decision block 417 controller 22 determines if counting variable $n_z$ is equal to $N_z$. If $n_z$ is not equal to $N_z$, controller 22 returns to block 409 to increase $n_z$ by 1 and again proceed to execute actions in blocks 409 to 417. If on the other hand $n_z$ is equal to $N_z$, the controller proceeds to a decision block 419 to determine if $n_p$ is equal to $N_p$. If $n_p$ is not equal to $N_p$ the controller returns to block 407 to increase $n_p$ by 1 and again proceed to execute actions in blocks 409 to 419, otherwise controller 22 may proceed to a decision block 421 to determine if $n_f$ is equal to $N_f$. If $n_f$ is not equal to $N_f$ controller 22 returns to block 405 to increase $n_f$ by 1 and again proceed to execute actions in blocks 407 to 421. If on the other hand $n_f$ is equal to $N_f$, CW-TOF camera 20 has acquired a desired amount of data to provide a range image for FOV 50 and scene 80, and in a block 423 processes the acquired data to provide the range image.

Figure 3A:
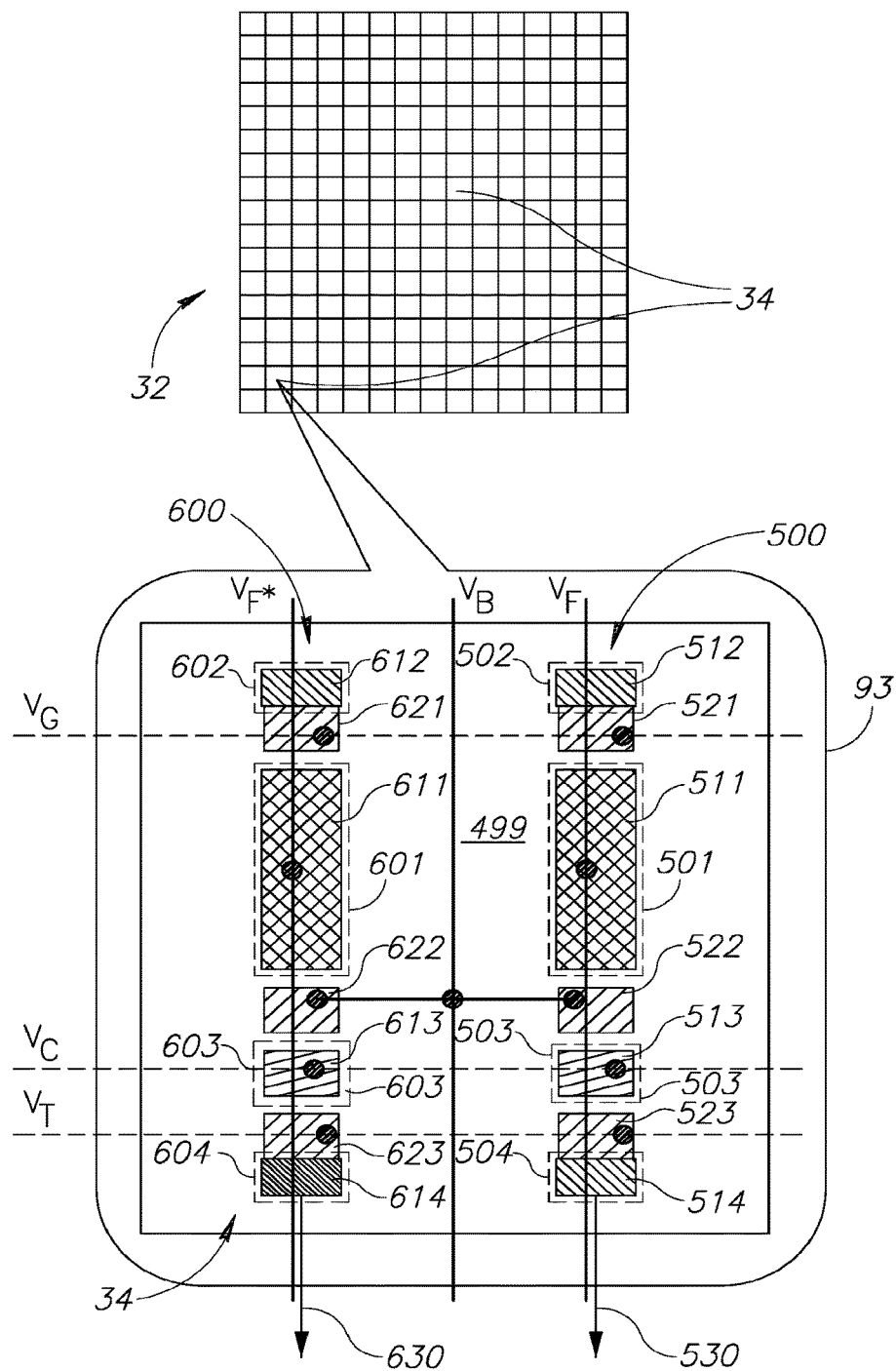
FIGS. 3A-3B schematically shows a photosensor of a CW-TOF zonal range camera and details of pixels in the photosensor configured to operate in a zonal imaging mode to acquire a range image of a scene, in accordance with an embodiment of the disclosure.

FIG. 3A schematically shows photosensor 32 having pixels 34 configured for operation in a CW-TOF zonal range camera such as range camera 20 in accordance with an embodiment of the disclosure. An enlarged, schematic top view of a pixel 34 showing details of the pixel construction is shown in an inset 93.

Pixel 34 may be implemented in front or back side illumination and comprise two, optionally parallel structures 500 and 600, each optionally independently controllable to accumulate photocharge generated by incident light and provide a readout voltage as a measure of the accumulated photocharge. Structure 500 optionally comprises a photosensitive region 501, a reset node 502, a charge storage node 503, and a readout node 504, formed in a semiconductor substrate 499 on which photosensor 32 is formed. Photosensitive region 501, reset node 502, charge storage node 503 and readout node 504 are overlaid by control electrodes 511, 512, 513, and 514 respectively. Electrode 511 controls sensitivity of photosensitive region 501 to light incident on the region. Gate electrodes 521, 522, and 523 are located between control electrodes 511 and 512, 511 and 513, and 513 and 514 respectively. Photosensitive region 501 comprises a photodiode or photogate (not shown), in which photocharge, optionally photoelectrons may be generated and accumulated responsive to light incident on the photosensitive region. Control electrode 511 overlying photosensitive region 501 may be transparent to light for which photosensitive region 503 is intended to accumulate photoelectrons and may for example be formed from polysilicon. Control electrodes 512, 513, and 514, and transfer gate electrodes 521, 522, and 523 may be substantially opaque to light that may generate photocharge in the nodes and regions under the electrodes. The opaque electrodes may for example be formed from salicided polysilicon. Readout node 504 is connected to an output circuitry (not shown) of photosensor 32 configured to readout photosensor 32. An arrow 530 represents a connection of readout node 504 to the output circuit.

Controller 22 applies a time varying voltage, $V_F$, typically modulated at a frequency of light that illumination system transmits, to control electrode 511 to control sensitivity of photosensitive region 501 to incident light. Controller 22 electrifies control electrode 512 with a drain voltage $V_{dd}$, and electrifies electrode 513 with a voltage $V_C$ that controls capacity of charge storage node 503 to store photocharge generated by photosensitive region 501. Controller 22 applies a voltage $V_G$ to gate electrode 521 to connect photosensitive region 501 to $V_{dd}$ node 502 and a bias voltage $V_B$ to gate electrode 522 to transfer photocharge from photosensitive region 501 to storage node 503. The controller transfers charge from storage region 503 to readout node 504 by applying a voltage $V_T$ to gate electrode 523.

Accumulation of photoelectrons in photosensitive region 501 and transfer of accumulated photoelectrons for storage to charge storage node 503 and from storage node 503 to readout node 504 may be controlled by suitably electrifying the control and gate electrodes. For example, applying a positive voltage $V_F$ to control electrode 511 overlying photosensitive region 501 relative to voltages $V_G$ and $V_B$ applied to gate electrodes 521 and 522 provides for accumulation of photoelectrons in photosensitive region 501. Photoelectrons accumulated in photosensitive region 501 may be transferred to storage node 503 by electrifying transfer gate electrode 522 with $V_B$ more positive than voltage $V_F$ applied to control electrode 511 overlying photosensitive region 501, and control electrode 513 overlying charge storage node 503 with voltage $V_C$ more positive than voltage $V_B$ applied to gate electrode 522. Electrifying transfer gate electrode 523 with voltage $V_T$ more positive than voltage $V_C$ applied to control electrode 513 and control electrode 514 more positive than voltage of transfer gate electrode 523 transfers photoelectrons stored in storage node 503 to readout node 504. In the readout node the transferred photoelectrons generate a readout voltage for readout and processing by the output circuitry of photosensor 32. Reset node 502 may be connected to a reset voltage source (not shown) and photosensitive region 501 may be reset and emptied of accumulated photoelectrons by electrifying transfer gate 521 positive relative to control electrode 511.

Structure 600 is similar to structure 500 and comprises a photosensitive region 601, reset node 602, charge storage node 603, and read out node 604 overlaid by control electrodes 611, 612, 613, and 614 respectively. Transfer gate electrodes 621, 622, and 623 are located between control electrodes 611 and 612, 611 and 613, and 613 and 614 respectively, and readout node 604 is connected to the output circuitry of photosensor 32 by a connection 630.

In an embodiment control electrodes 511 and 611 are electrified via different control lines, because as described below controller 22 may apply different voltages to the electrodes, and corresponding electrodes other than electrodes 511 and 611 may be electrified via same control lines. By way of example, as schematically shown in FIG. 3A voltages $V_F$ and $V^*_F$ are respectively provided to electrodes 511 and 611 in a same column of pixels 34 over pixel column control lines labeled $V_F$ and $V_F^*$. Voltage $V_B$ may be applied to gate electrodes 522 and 622 in a same column of pixels 34 via a pixel column control line labeled $V_B$. Pixel row control lines labeled $V_C$, $V_G$, and $V_T$ may provide voltages $V_C$, $V_G$, and $V_T$ to pairs of corresponding gate electrodes 513 and 613, 521 and 621, and 523 and 623 in a same row of pixels respectively.

Pixel 34 may be activated by electrifying control and gate electrodes in the pixel as described above to enable photosensitive regions 501 and 601 to accumulate photoelectrons. The pixel may be controlled to store photoelectrons by electrifying electrodes in the pixels to transfer photoelectrons from photosensitive regions 501 and 601 to storage nodes 504 and 604. Pixel 34 may be inactivated by maintaining photosensitive regions 501 and 601 connected to reset nodes 512 and 612. The pixel may be readout by transferring photoelectrons stored in storage nodes 503 and 603 to readout nodes 504 and 604 respectively from where they may be sensed by the output circuitry of photosensor 32.

In an embodiment, for a given offset phase, controller 22 temporally modulates voltage applied to control electrodes 501 and 601 overlying photosensitive regions 501 and 601 at a frequency of modulation of light that illumination system 60 transmits to illuminate a scene, such as scene 80 that CW-TOF zonal camera 20 images. Modulation of electrodes 501 are 601 may be out of phase by 180° and one of the electrodes 501 and 601 may be phase shifted by the offset phase relative to a phase of modulation of the illuminating light from the illumination system. The output circuitry may use a difference between readout voltages provided by readout nodes 504 and 604 responsive to photoelectrons accumulated by photosensitive regions 501 and 601 to determine a distance to a feature imaged on pixel 34 and provide a range image for scene 80.

Figure 3B:
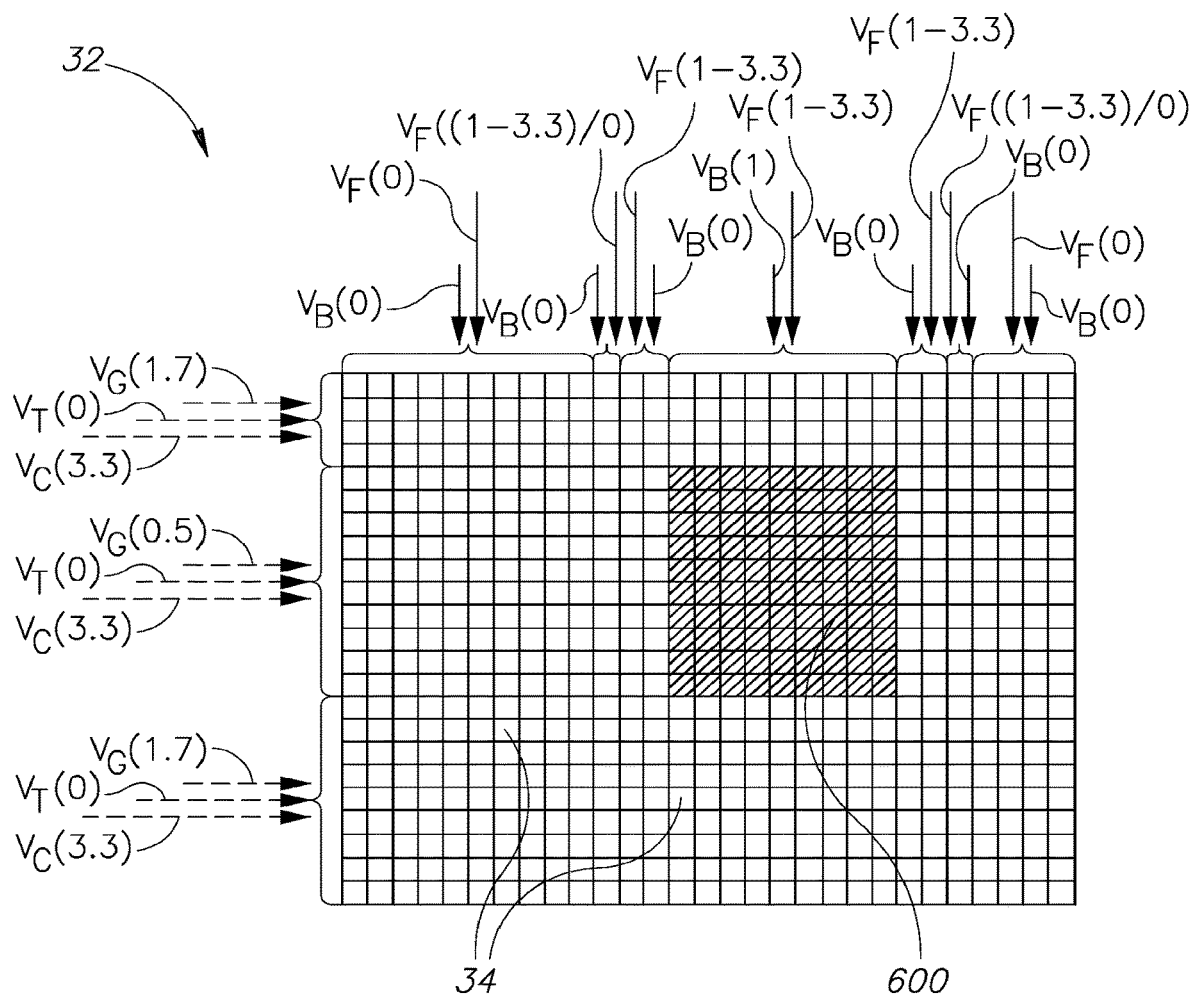

FIG. 3B schematically illustrates how controller 22 (FIG. 1A-1D) may electrify electrodes of pixels 34 in photosensor 32 to activate a region 600 of photosensor 32 corresponding to an illuminated zone (not shown) in FOV 50 of CW-TOF zonal camera 20 (FIG. 1A) in accordance with an embodiment of the disclosure. Column control lines are schematically represented by solid arrows pointing along columns of photosensor 32 labeled by the voltages $V_F$ and $V_B$. Row control lines are schematically represented by dashed arrows pointing along rows of photosensor 32 labeled by the voltages they provide $V_G$, $V_T$, and $V_C$. Voltages applied to column control lines $V_F$ and $V_B$ as a function of column location are shown in parentheses following the symbol of the control line. For convenience of presentation and to prevent clutter column control lines $V_F$ and $V^*_F$ shown in FIG. 3A are represented in FIG. 3B by $V_F$. As noted above, voltages $V_F$ and $V^*_F$ are time varying voltages modulated out of phase by 180° at a frequency equal to a frequency at which illumination system 60 modulates light that it transmits to illuminate a scene that CW-TOF zonal camera 20 images. For columns of pixels for which $V_F$ and $V^*_F$ vary between same maximum and minimum voltages the maximum and minimum voltages are shown separated by a hyphen in parentheses following the symbol $V_F$ labeling the control line. For example for columns of pixels that traverse activated region 600 of photosensor 32, the column pixel control lines $V_F$ show a voltage range (1-3.3) to indicate that both $V_F$ and $V^*_F$ vary between 1 volt and 3.3. For pixel control lines $V_F$ for which $V_F$ and $V^*_F$ have different ranges the ranges are shown separated by a slash "/" with the range for $V_F$ to the left of the slash and the range for $V^*_F$ to the right of the slash. For the voltage configuration shown in FIG. 3A only pixels 34 in activated region 60 of photosensor 32 generate and store photocharge responsive to incident light. The active region may be moved and reconfigured by changing the pattern of voltages applied to the column and row control lines.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. An active illumination range camera operable to determine distances to features in a scene, the range camera comprising:
   an imaging system characterized by a field of view (FOV) and comprising a photosensor having light sensitive pixels, and an optical system configured to collect light from a scene in the FOV and image the collected light onto pixels of the photosensor;
   an illumination system controllable to generate and direct a field of illumination (FOI) to illuminate at least a portion of the FOV; and
   a controller operable to:
      partition the at least a portion of the FOV into a plurality of zones;
      control the illumination system to generate and direct a FOI to sequentially illuminate the zones in turn with transmitted light through selectively activating and deactivating portions of the photosensor correlated to pixels of the zones;
      accumulate photocharge reflected by features within the zones from the transmitted light; and
      increment a counter value upon illumination of each of the zones;
      halt illumination of the zones once the counter value reaches a maximum count; and
      determine distances to features in the scene using the accumulated photocharge reflected by the features within the zones from the transmitted light.

2. The active illumination range camera according to claim 1 wherein sequentially illuminating the zones in turn comprises illuminating each zone a plurality of times to acquire data sufficient to determine distances to the features of the scene in the zone before illuminating a next zone.

3. The active illumination range camera according to claim 2 wherein the controller is operable following illumination of each zone the plurality of times to read out the pixels in the corresponding region.

4. The active illumination range camera according to claim 3 further comprising providing a range image of the features in each zone and combining the provided range images to provide a range image of the scene.

5. The active illumination range camera according to claim 1 wherein sequentially illuminating the zones in turn comprises:
   (a) illuminating each zone once in sequence to accumulate the photocharge to acquire a portion of the data for providing a range image of the scene; and
   (b) repeating (a) a number of times until the counter value reaches the maximum count.

6. The active illumination range camera according to claim 5 wherein the controller is operable following illumination of a zone to store the photocharge accumulated by pixels in photosensor region corresponding to the zone in the pixels.

7. The active illumination range camera according to claim 6 wherein the controller is operable upon completion of each repetition, to read the photosensor to acquire a frame of the photosensor.

8. The active illumination range camera according to claim 7 wherein the controller is operable to using data in all the frames to provide a range image of the scene following a last acquisition of a frame.

9. The active illumination range camera according to claim 6 and comprising reading the pixels in the region to acquire a frame of the region prior to illuminating a next region of the photosensor.

10. The active illumination range camera according to claim 1 wherein partitioning the FOV into zones comprises determining a number of zones.

11. The active illumination range camera according to claim 10 wherein determining a number of the zones comprises determining the number based on reflectance of features in the FOV.

12. The active illumination range camera according to claim 1 wherein the controller is operable to control intensity of light in the FOI illuminating a zone and/or duration of exposure of the zone to the light based on reflectance of features in the zone.

13. The active illumination range camera according to claim 1 and comprising at least one or any combination of more than one of a continuous wave time of flight (CW-TOF) camera, a gated time of flight (GT-TOF) camera, a structured light range camera, and/or a stereo range camera.

14. The active illumination range camera according to claim 1 and comprising:
   controlling the illumination system to generate and direct a FOI that illuminates a zone with time modulated light characterized by a modulation frequency; and
   differentially time modulating sensitivity to light of pixels in the corresponding region of the photosensor at the modulation frequency of the modulated light but phase shifted from a phase of modulation of the light by an offset phase.

15. A method for determining distances to features in a scene, the method comprising:
   partitioning a field of view (FOV) of a camera in which the scene is located into a plurality of zones;
   generating and directing a field of illumination of a light source (FOI) to sequentially illuminate the zones in turn with transmitted light through selectively activating and deactivating portions of a photosensor correlated to pixels of the zones;
   accumulating photocharge reflected by features within zones from the transmitted light;
   incrementing a counter value upon illumination of each of the zones;
   halt illumination of the zones once the counter value reaches a maximum count; and determining distances to features in the scene using the accumulated photocharge reflected by the features within the zones from the transmitted light.

16. The method according to claim 15 wherein sequentially illuminating the zones in turn comprises illuminating each zone a plurality of times to acquire data sufficient to determine distances to features of the scene in the zone before illuminating a next zone.

17. The method according to claim 16 and following illumination each zone the plurality of times reading out the pixels in the corresponding region.

18. The method according to claim 15 wherein sequentially illuminating the zones in turn comprises:
(a) illuminating each zone once in sequence to accumulate photocharge to acquire a portion of the data for providing a range image of the scene;
(b) repeating (a) a number of times sufficient to acquire all the data for providing the range image.

19. The method according to claim 18 and comprising:
following illumination of a zone storing the photocharge accumulated by pixels in the photosensor region corresponding to the zone in the pixels; and
upon completion of each repetition, reading the photosensor to acquire a frame of the photosensor; and
following completion of repetition last repetition using data in all the frames to provide a range image of the scene.

20. One more computer-storage memory devices embodied with instructions that are executable for determining distances to features in a scene, comprising:
partitioning a field of view (FOV) of a camera in which the scene is located into a plurality of zones;
generating and directing a field of illumination of a light source (FOI) to sequentially illuminate the zones in turn with transmitted light through selectively activating and deactivating portions of a photosensor correlated to pixels of the zones;
accumulating photocharge reflected by features within zones from the transmitted light;
incrementing a counter value upon illumination of each of the zones;
halt illumination of the zones once the counter value reaches a maximum count; and
determining distances to features in the scene using the accumulated photocharge reflected by the features within the zones from the transmitted light.

* * * * *